(12) United States Patent
Shimizu et al.

(10) Patent No.: US 6,292,216 B1
(45) Date of Patent: Sep. 18, 2001

(54) CONTROL SIGNAL GENERATING CIRCUIT

(75) Inventors: Katsuhiro Shimizu, Tokyo; Shunji Umemura, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/288,978

(22) Filed: Apr. 9, 1999

(30) Foreign Application Priority Data

Apr. 14, 1998 (JP) .................................................. 10-102942

(51) Int. Cl.[7] ............................ H04N 17/00; H04N 7/00; H04N 7/08
(52) U.S. Cl. ........................... 348/177; 348/177; 348/178; 348/180; 348/461; 348/476; 348/184
(58) Field of Search ..................................... 348/177, 178, 348/180, 184, 185, 476, 477, 478, 473, 500, 461, 466, 467, 1, 4

(56) References Cited

U.S. PATENT DOCUMENTS

| | | | | |
|---|---|---|---|---|
| 5,083,523 | * | 1/1992 | Frazier | 358/29 |
| 5,450,134 | * | 9/1995 | Legate | 348/467 |
| 5,557,334 | * | 9/1996 | Legate | 348/473 |
| 5,621,454 | * | 4/1997 | Ellis et al. | 348/2 |
| 5,790,169 | * | 8/1998 | Hohenacker | 348/2 |
| 5,872,593 | * | 2/1999 | Kawashima | 348/181 |
| 5,923,366 | * | 7/1999 | Kawashima | 348/190 |

* cited by examiner

*Primary Examiner*—Reinhard J. Eisenzopf
*Assistant Examiner*—Paulos M. Natnael
(74) *Attorney, Agent, or Firm*—Jay H. Maioli

(57) ABSTRACT

A display apparatus in which a marker signal created by combining primary color signals of predetermined levels in an arbitrary pattern and designating a specified area of a screen is detected, the screen is divided into a plurality of areas and a display formed of an image different in picture quality is present at each one of the plurality of areas, a control signal for suppressing the luminance of the marker signal is generated, to thereby make the marker signal inconspicuous.

4 Claims, 9 Drawing Sheets

CONTROL SIGNAL GENERATING CIRCUIT

BACKGROUND OF THE INVENTION

1. Field of the Invention

The present invention relates to a control signal generating circuit suitable for use with a display apparatus or the like in which a picture screen, for example, is divided into a plurality of areas and images of different picture qualities are displayed in these areas. More particularly, the present invention relates to a control signal generating circuit in which, when a picture quality of every area is improved by using a marker signal, the marker signal can be made inconspicuous.

2. Description of the Related Art

In a display apparatus such as a television receiver for displaying a video signal based on a television broadcasting and a video signal played back from a video tape or the like, for example, in order to improve a display picture quality of a still picture represented by a photographic picture or the like and a moving picture represented by a motion picture or the like, there have heretofore been implemented picture quality improvement techniques such as enlarging a brightness difference (hereinafter referred to as a contrast ratio) between a white level and a black level of displayed picture by increasing an amplifying ratio of a video signal, for example, or emphasizing a contour of a picture (hereafter referred to as a sharpness).

There have been realized a variety of semiconductor integrated circuits (hereinafter referred to as ICs) having more than one such picture quality improvement function to improve these picture quality improvement functions by control means using a direct current voltage (hereinafter referred to as a DC voltage) from the outside, for example, or information transmission means such as a so-called bus communication and so on. As representing examples of such semiconductor integrated circuit, there are known a preamplifier IC for use in a video amplifying circuit, for example, an RGB decode IC for decoding luminance/color difference signals to provide red/green/blue signals or the like.

By the way, in a monitor display apparatus for displaying an output of a computer, for example, it has been a main purpose to display information of characters, digital numbers and so on of document and spreadsheet or the like outputted from a computer. Therefore, the monitor display apparatus is generally used in order to display an image signal supplied from a computer in the form of a binary signal of "1/0", for example, at a proper luminance level.

On the other hand, in a computer having multimedia capabilities, not only information of the above-mentioned characters and digital number but also images of photographs, and moving pictures and the like from a disk apparatus and a video card had heretofore been displayed in an arbitrary range called a window. In that case, since the images of photographs, moving pictures and so on thus taken into the computer are low in contrast and sharpness as compared with information such as characters, digital numbers and the like, when they are displayed together with such information, picture qualities of photograph and moving picture or the like are deteriorated considerably.

Therefore, in such monitor display apparatus, in order to improve picture qualities of images of photograph and moving picture or the like, it has been considered to improve the above-mentioned contrast ratio and sharpness.

However, in the conventional monitor display apparatus, it is unavoidable that such picture quality improvement such as enlargement of the above-mentioned luminance difference, the contour emphasis and so on is uniformly effected on the whole of the picture screen. As a result, when the picture screen has therein the display areas of characters and digital numbers or the like, there is then the risk that these displayed characters and digital numbers or the like become difficult to read. In particular, when displayed characters and digital numbers or the like are too high in brightness, user's eyes tire easily.

Also, recently, as so-called internet have been developed and a text broadcasting is widespread, increasing an opportunity at which general television receivers display images of photograph and moving pictures or the like and characters and digital numbers or the like on one picture screen. Accordingly, also in such a television receiver, when such picture quality improvement such as enlargement of the above-mentioned luminance difference and the contour emphasis or the like is uniformly effected on the whole of the picture screen, there is then the risk that these characters and digital numbers displayed on the picture screen become difficult to read.

On the other hand, the inventors of this application have previously proposed a display apparatus (PCT application No. JP98/04747) in which a marker signal comprised of combinations of arbitrary patterns of primary colors of predetermined levels is formed in a video signal, this marker signal is detected and different image processing is effected at every detected area.

That is, as shown in FIG. 9, red/green/blue video signals (R/G/B) inputted to input terminals 1R, 1G, 1B are respectively supplied through capacitors 2R, 2G, 2B to a preamplifier IC 3. In this preamplifier IC 3, the supplied video signals (R/G/B) are respectively supplied through clamping circuits 31R, 31G, 31B to sharpness improvement circuits 32R, 32G, 32B, which will be described later on, and further outputted through amplifiers 33R, 33G, 33B which will be described later on.

The video signals (R/G/B) outputted from this preamplifier IC 3 are amplified by an output amplifier 4 and then outputted through capacitors 5R, 5G, 5B. Further, these video signals (R/G/B) thus outputted are DC-voltage-converted by a cutoff adjustment amplifier 6 and then supplied to a cathode-ray tube (hereinafter referred to as a CRT)7, for example, serving as a display means, thereby resulting in an image based on picture-quality-improved video signals (R/G/B), which will be described later on, being displayed on the screen of the CRT 7.

A microcomputer (hereinafter referred to as a microcomputer: although not shown) exiting within this apparatus and which controls a variety of functions is adapted to generate data of first and second DC voltages for controlling the above-mentioned sharpness and data of first and second DC voltages for controlling the contrast ratio, for example. Further, the data thus generated are supplied to D/A-converting (hereinafter referred to as a DAC) circuits 34A and 34B; and 35A and 35B, in which they are respectively converted into control DC voltages.

The control DC voltages thus converted by these DAC circuits 34A and 34B; and 35A and 35B are selected by switch circuits 36, 37 and then supplied to the above-mentioned preamplifier IC 3. Thus, the preamplifier IC 3 controls the above-mentioned sharpness improvement circuits 32R, 32G, 32B and the above-mentioned amplifiers 33R, 33G, 33B in accordance with the supplied control DC voltages, thereby resulting in the sharpness and the contrast ratio being improved.

Further, in this apparatus, video signals (R/G/B) upon which marker signals for designating arbitrary areas of the picture screen from, for example, an outside computer (not shown) are superimposed are supplied to the input terminals 1R, 1G, 1B. Here, the marker signals are comprised of arbitrary signal patterns, respectively, and signal patterns 101a, 101b, 102a, 102b comprising these arbitrary marker signals are respectively provided at four corners of an area 100 to be detected as shown in FIG. 10, for example.

Accordingly, in the apparatus shown in FIG. 9, the video signals from the above-mentioned input terminals 1R, 1G are supplied through amplifiers 8R, 8G to input terminals of shift registers 9R, 9G, and the video signal from the input terminal 1B is supplied through a comparator 8B to clock terminals of the shift registers 9R, 9G. The signals thus accumulated in these shift registers 9R, 9G are supplied to a comparator 10C, in which they are compared with a signal pattern 101 or 102 stored in a memory 10M, for example.

Therefore, there are detected the above-mentioned signal patterns 101a, 101b, 102a, 102b. That is, in these signal patterns, as shown in FIG. 11, for example, using the blue (B) signal of the video signal, for example, as a clock, red (R) and blue (B) signals constitute a marker signal. Then, at the timing of the leading edge (trailing edge of the inverted signal) of the blue (B) signal, the patterns of the red (R) and green (G) signals are latched in the above-mentioned shift registers 9R, 9G, for example.

In the illustrated example, for example, a pattern of (1011) is latched in the shift register 9R, and a pattern of (0111) is latched in the shift register 9G. Further, these patterns are compared with the patterns stored in the memory 10M and thereby the signals patterns 101, 102 which become arbitrary marker signal are detected. Incidentally, the arrangement of the illustrated signals is described by way of example, and it is needless to say that various kinds of signal patterns can be generated by changing the above-mentioned patterns or by increasing or decreasing the number of bits or the like.

Also, a horizontal synchronizing signal from an input terminal 11H is supplied to a PLL (Phase-Locked Loop )circuit 12. An oscillation signal from an oscillator 13 is supplied to this PLL circuit 12 which then generates an arbitrary clock signal synchronized with the horizontal synchronizing signal. This clock signal is supplied to a count terminal of a horizontal counter 14H, and a horizontal synchronizing signal or a signal synchronized with the horizontal synchronizing signal is supplied to a reset terminal. Thus, this horizontal counter 14H outputs a count value corresponding to the horizontal position on the display screen.

Further, the horizontal synchronizing signal is supplied to a count terminal of a vertical counter 14V, and a vertical synchronizing signal from an input terminal 11V or a signal synchronized with the vertical synchronizing signal is supplied to a reset terminal. Thus, this vertical counter 14V outputs a count value corresponding to a vertical position (scanning line) on the display screen. The count values of these horizontal counter 14H and vertical counter 14V are supplied to latch circuits 15A, 15B and 16A, 16B, respectively.

Detection signals of the signal patterns 101, 102 detected by the above-mentioned comparator 10C are supplied to trigger terminals of latch circuits 15A, 16A and 15B, 16B, respectively. Thus, the latch circuit 15A latches the count value corresponding to the horizontal position of the signal pattern 101a or 101b on the display screen, for example.

Also, the latch circuit 15B latches the count value corresponding to the horizontal position of the signal pattern 102a or 102b on the display screen, for example.

Further, the latch circuit 16A latches the count value corresponding to the vertical position of the signal pattern 101a or 102a on the display screen, for example. Also, the latch circuit 16B latches the count value corresponding to the vertical position of the signal pattern 101b or 102b on the display screen, for example.

Then, the signals latched in these latch circuits 15A, 15B and 16A, 16B are supplied to comparators 17A, 17B and 18A, 18B, respectively, and the count values of the above-mentioned horizontal counter 14H and vertical counter 14V are supplied to the comparators 17A, 17B and 18A, 18B, respectively.

Thus, the comparator 17A outputs a signal when the count value of the horizontal counter 14H agrees with the count value of the horizontal position of the signal pattern 101a or 101b latched in the latch circuit 15A. Also, the comparator 17B outputs a signal when the count value of the horizontal counter 14H agrees with the count value of the horizontal position of the signal pattern 102a or 102b latched in the latch circuit 15B.

Further, the comparator 18A outputs a signal when the count value of the vertical counter 14V agrees with the count value of the vertical position of the signal pattern 101a or 102a latched in the latch circuit 16A. Also, the comparator 18B outputs a signal when the count value of the vertical counter 14V agrees with the count value of the vertical position of the signal pattern 101b or 102b latched in the latch circuit 16B.

Then, the signals from these comparators 17A and 17B are supplied to set and reset terminals of a flip-flop 19H, thereby resulting in a pulse signal corresponding to a width of a horizontal direction of the area 100 shown at B in FIG. 10 being outputted. Also, the signals from the comparators 18A and 18B are supplied to set and reset terminals of a flip-flop 19V, thereby resulting in a pulse signal corresponding to a width of a vertical direction of the area 100 shown at C in FIG. 10 being outputted.

Further, signals from these flip-flops 19H and 19V are synthesized by a multiplier 20 and thereby a control signal shown at D in FIG. 10 is generated. Then, this control signal is supplied to the above-mentioned switch circuits 36, 37, whereby the control DC voltages converted by the DAC circuits 34A or 34B, and 35A or 35B are selected.

Thus, of the image displayed on the above-mentioned CRT 7, the sharpness and the contrast ratio of the image in the arbitrary area designated by the above-mentioned control signal are changed. That is, it is possible to increase the sharpness and the contrast ratio of only the area 100 of the image such as a photograph and a moving picture or the like captured in a display screen. Thus, a picture quality of an image such as captured photograph and moving picture or the like can be improved. Incidentally, the picture quality can also be improved by other suitable methods such as a gamma correction, a color correction and the like.

However, in this apparatus, the signal patterns 101a, 101b, 102a, 102b comprising the above-mentioned marker signals are determined irrespective of the original superimposed video signal. As a result, if the signal patterns have luminance and hue differences between them and the original video signal, then there is a fear that the signal patterns 101a, 101b, 102a, 102b become conspicuous on the displayed picture.

That is, the signal patterns 101a, 101b, 102a, 102b comprising the marker signals are superimposed upon the original video signal at a very high level in order to make the detection of the marker signal become reliable. Further, since these signal patterns are comprised of combinations of primary colors, they become conspicuous in the image such as the photograph and the moving picture or the like displayed on the area 100, for example. As a result, these signal patterns become offensive to the eye, and become factors for remarkably degrading commerciality of a product on which such processing is effected.

In view of the aforesaid aspect, the present application is made, and the problem to be solved is that, in the conventional apparatus, the signal patterns comprising the marker signals become conspicuous on the displayed picture and the superimposed signal patterns become offensive to the eye, thereby resulting in commerciality of the product on which such processing is effected being degraded.

SUMMARY OF THE INVENTION

According to the present invention, relative to a video signal upon which a marker signal for designating an arbitrary area of a displayed picture is superimposed, the marker signal and its duration time are detected, and a control signal for changing the luminance of the video signal is generated by designating a range including such marker signal. An object of the present invention is to provide a circuit which improves commerciality of a product on which such processing is effected by making the superimposed signal patterns become inconspicuous.

That is, in one mode of the present invention, there is provided a control signal generating circuit using a marker signal in which a video signal has therein a signal which results from combining primary color signals of predetermined levels by an arbitrary pattern, a marker code is generated by a pattern of other of the primary color signals using the pattern of the one primary color signal as a clock, the marker signal designating an arbitrary area of a picture displayed by at least the video signal, which is including a marker signal detector for detecting the marker signal, a frequency measuring device for measuring horizontal and vertical synchronizing signal frequencies of the video signal, a processor for calculating a duration time of the marker signal from the measured horizontal and vertical synchronizing signal frequencies and a length of the marker signal, and a blanking signal generator for generating a blanking signal for blanking the video signal by designating an area including the marker signal with the calculated duration time.

Also, in another embodiment of the present invention, there is provided a control signal generating circuit using a marker signal in which a video signal has therein a signal which results from combining primary color signals of predetermined levels by an arbitrary pattern, a marker code is generated by a pattern of other primary color signals using the pattern of the one primary color signal as a clock, the marker signal designating an arbitrary area of the picture screen displayed by at least the video signal has a code capable of measuring a duration time of the marker signal to the marker signal added to a horizontal direction starting end of at least the area, which includes a marker signal detector for detecting the marker signal, a processor for calculating a duration time of the marker signal by using the code capable of measuring the duration and a blanking signal generator for generating a blanking signal for blanking the video signal by designating an area including the marker signal with the calculated duration time.

DESCRIPTION OF THE PREFERRED EMBODIMENTS

Figure 1:
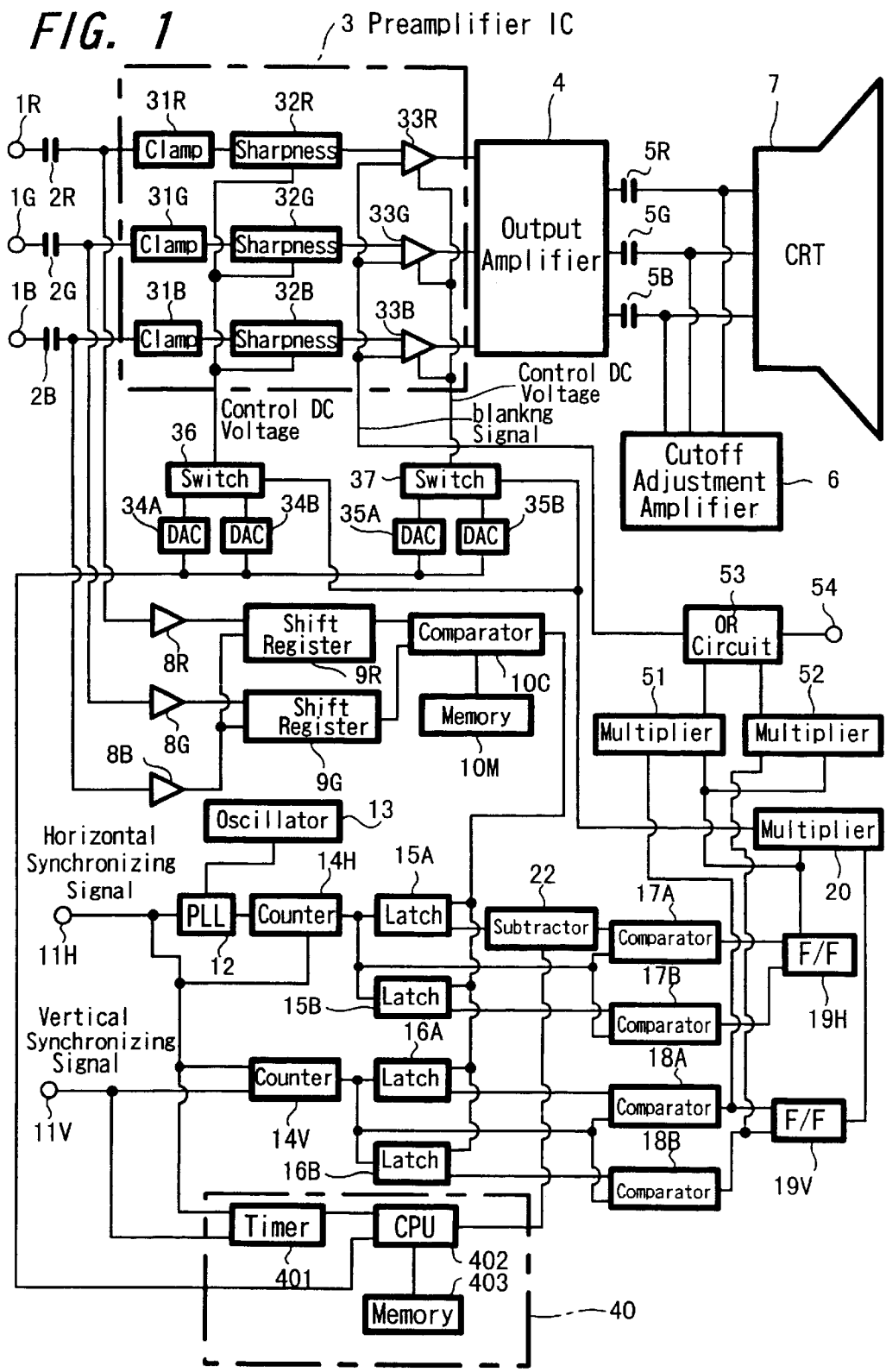
FIG. 1 is a block diagram showing an example of a display apparatus to which a control signal generating circuit according to a first embodiment of the present invention is applied.
Figure 9:
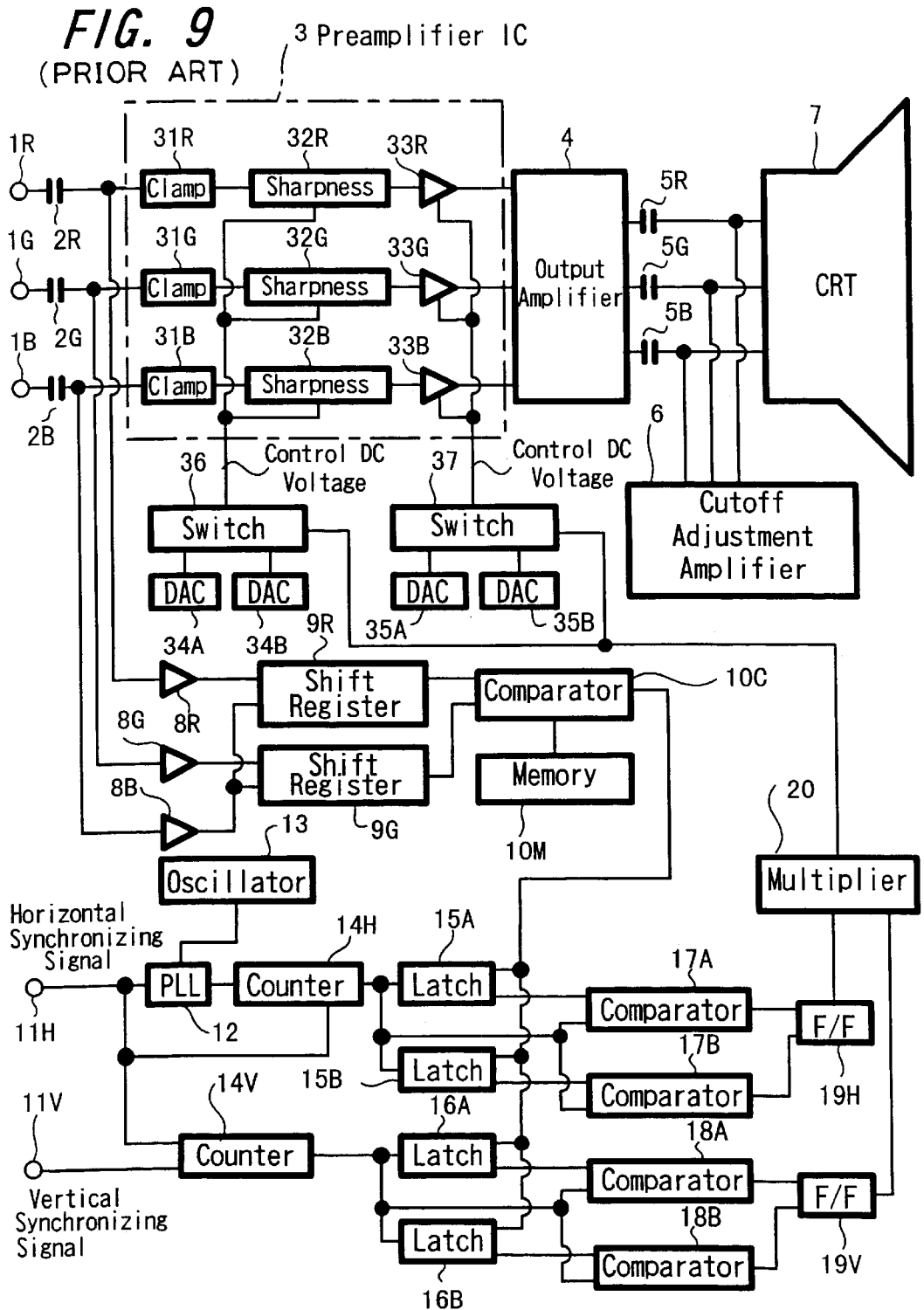
FIG. 9 is a block diagram showing a display apparatus to which a conventional control signal generating circuit is applied.
Figure 10:
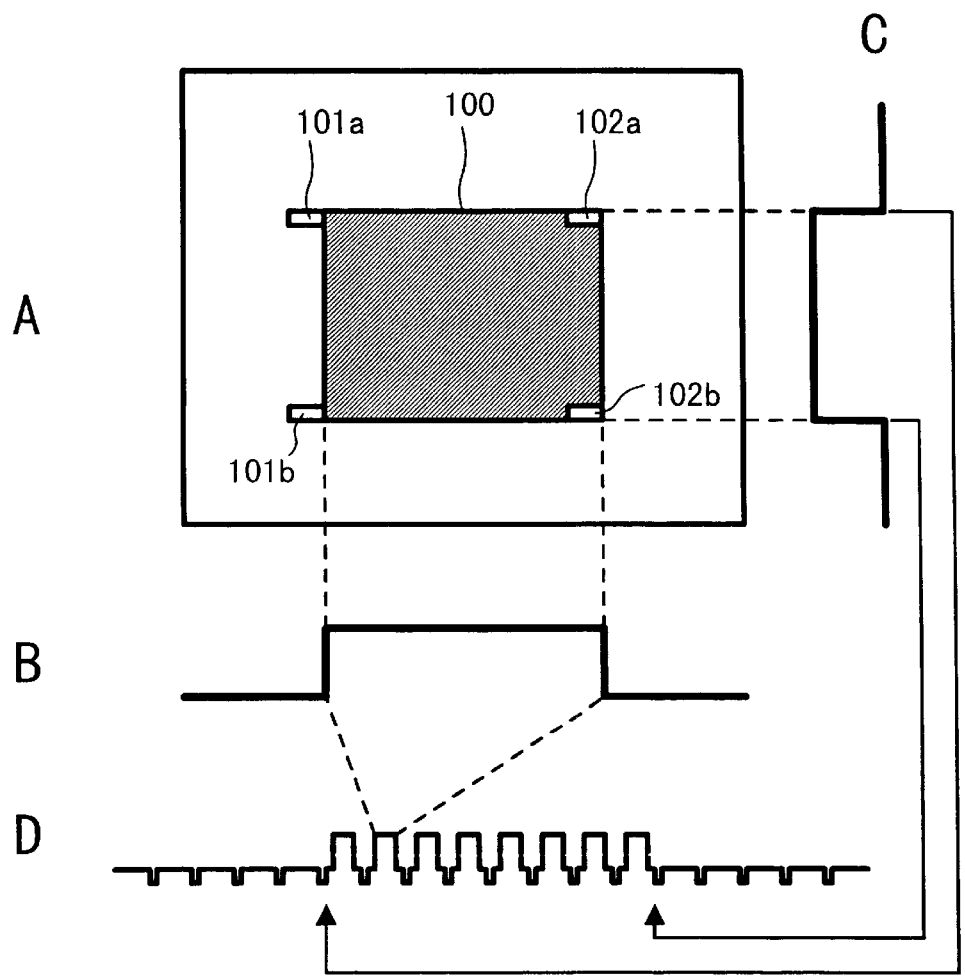
FIG. 10 is a diagram used to explain a signal pattern.
Figure 11:
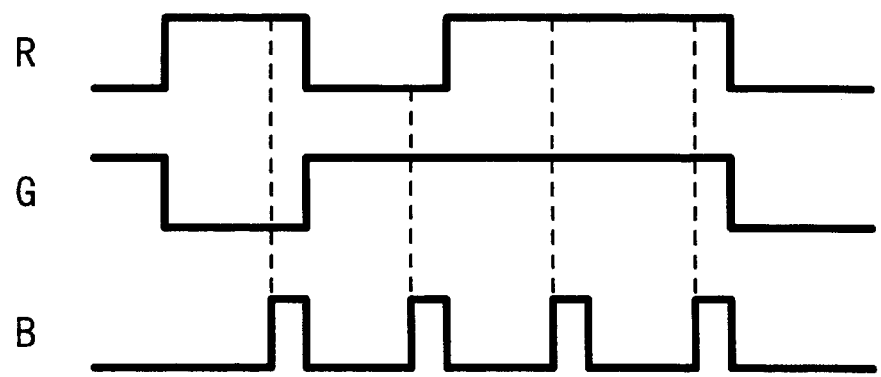
FIG. 11 is a diagram used to explain a marker signal.

FIG. 1 is a block diagram showing an arrangement of an example of a display apparatus to which a control signal generating circuit according to one embodiment of the present invention is applied. Incidentally, FIG. 1 is based on the arrangement of FIG. 9. Accordingly, in the following description, elements and parts corresponding to those of FIG. 9 are marked with the same reference numerals and an overlapping explanation thereof will be omitted.

In FIG. 1, the horizontal and vertical synchronizing signals supplied to the above-mentioned input terminals 11H, 11V are supplied to a timer 401 housed in a microcomputer 40 and thereby horizontal and vertical synchronizing signal frequencies are measured. The horizontal and vertical synchronizing signal frequencies thus measured are supplied to a central processing unit (hereinafter referred to as a CPU) 402 which then calculates a duration time of signal patterns comprising the above-mentioned marker signal from data stored in a memory 403.

Further, a value of a count value of a horizontal clock signal corresponding to the duration time thus calculated is computed by the CPU 402. Then, the value thus computed is supplied from the microcomputer 40 to a subtractor 22 provided at the output of the latch circuit 15A, for example. Thus, the subtractor 22 can shift the position of the marker signal stored in the latch circuit 15A, for example, to the front side of the horizontal direction by an amount of the above-mentioned duration time thus calculated.

Figure 2:
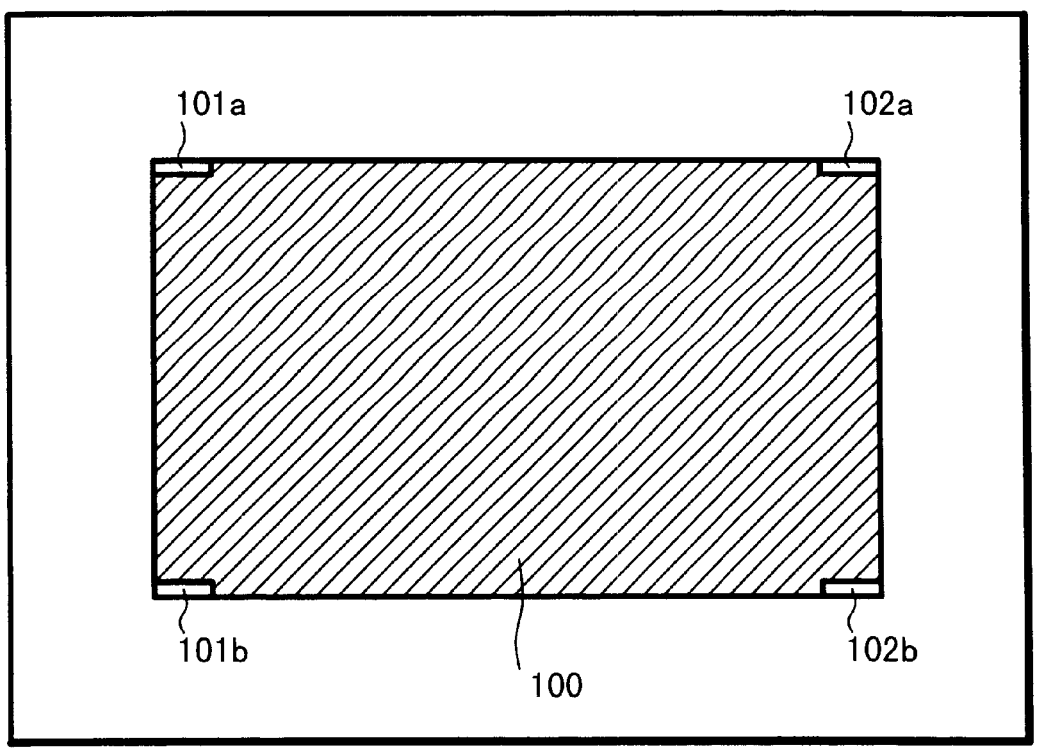
FIG. 2 is a diagram used to explain signal pattern.

Thus, as shown in FIG. 2, for example, the signal patterns 101*a*, 101*b* comprising the marker signal at the front side of the horizontal direction can be provided at the inside of the area 100 detected by the marker signal. As a consequence, the signal patterns 101*a*, 101*b* at the front side of the horizontal direction can be formed within the area 100 so that the area 100 can be set with ease.

Figure 3:
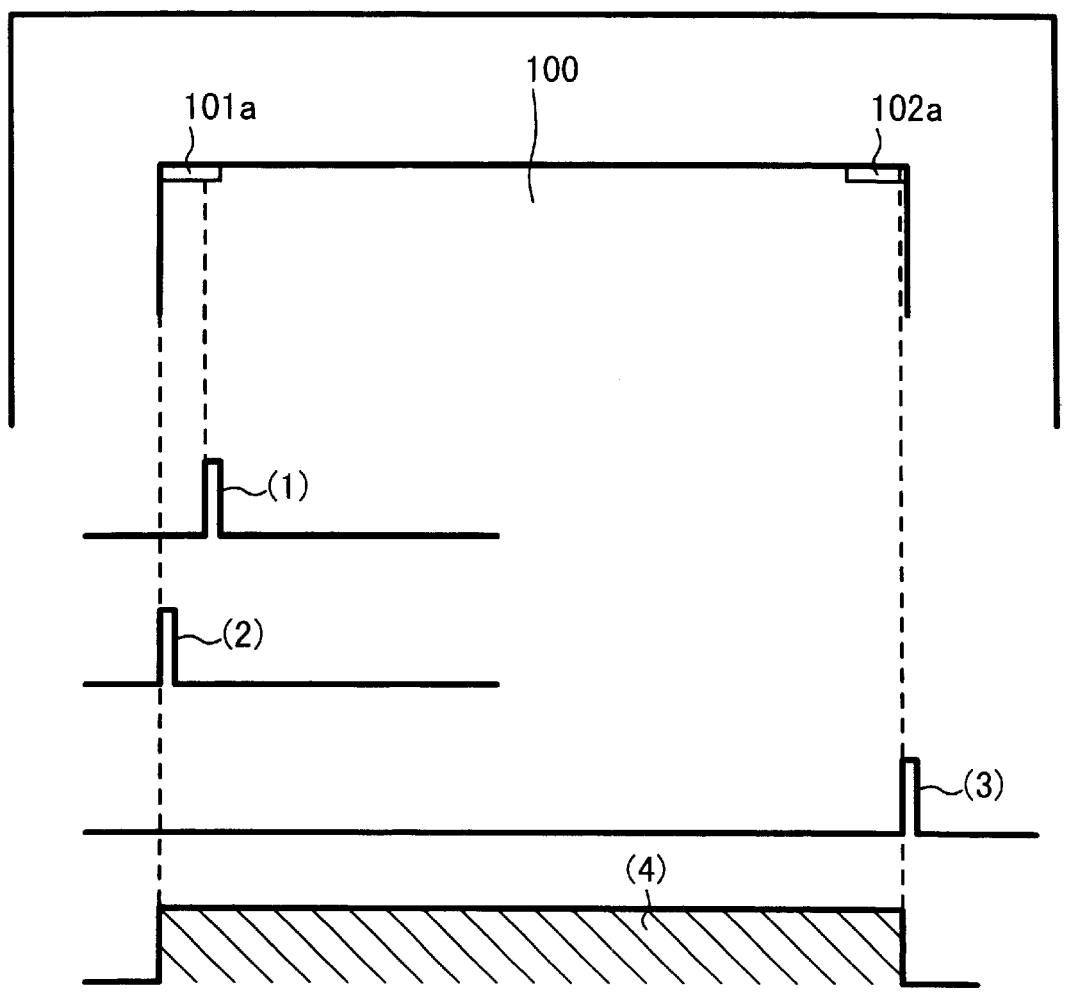
FIG. 3 is a diagram used to explain a marker signal detection.

Specifically, in this apparatus, the comparator 17A can correct and output a signal, which should be detected inherently near the ending end of the signal pattern as shown by (1) in FIG. 3, for example, at a timing point of a starting end of the signal pattern 101*a* as shown by (2). Then, on the basis of the signal of (2) and the signal detected near the ending end of the signal pattern 102a supplied from the comparator 17B as shown by (3), for example, the flip-flop 19H outputs a signal corresponding to a full width of the area in the horizontal direction as shown by (4) for example.

In the above-mentioned picture arrangement of FIG. 2, the signal patterns 101a and 102a, and 101b and 102b are provided within the same scanning lines, respectively. Also, the signal patterns 101a and 101b, and 102a and 102b are disposed at the same positions in the vertical direction, respectively.

Figure 4A:
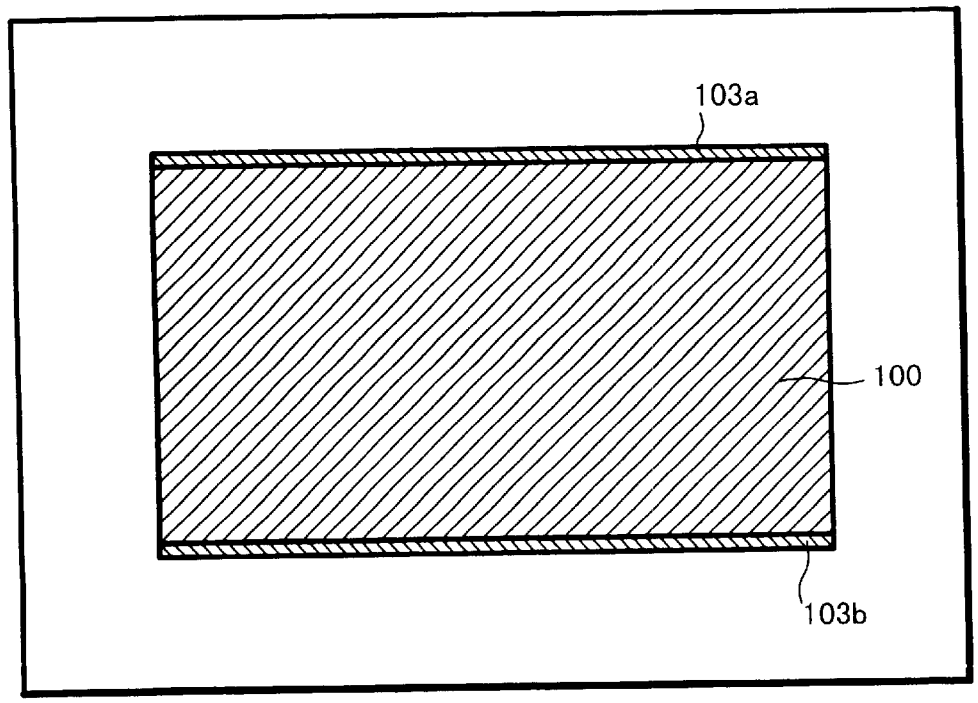
FIGS. 4A and 4B are each a diagram used to explain a blanking range including a marker signal.

Further, in this apparatus, signals from the comparators 18A and 18B are respectively supplied to multipliers 51, 52. Also, the above-mentioned signal (4) from the flip-flop 19H is supplied to the multipliers 51, 52. Thus, the multipliers 51, 52 generate signals 103a, 103b corresponding to the full width of the area 100 in the horizontal direction including the positions of the respective signal patterns 101a, 102a, 101b, 102b as shown in FIG. 4A, for example.

That is, the signals generated from these multipliers 51, 52 are signals for designating the range including the respective marker signals. Accordingly, these signals are synthesized by an OR circuit 53. Then, this synthesized signal is supplied to amplifiers 33R, 33G, 33B within the preamplifier IC 3, for example, whereby a blanking can be effected on the display by interrupting the video signal supplied from this preamplifier IC 3 to the CRT 7. Thus, it is possible to erase the display of the signal patterns on the display screen.

Accordingly, in this apparatus, relative to a video signal upon which marker signals for designating an arbitrary area of a displayed picture are superimposed, the marker signal and its duration are detected, and a blanking signal for blanking the video signal is generated by designating an range including such marker signal. According to this arrangement, it is possible to improve commerciality of a product on which such processing is effected by making the superimposed signal patterns become inconspicuous.

Thus, according to the present invention, it is possible to easily solve the problem that, in the conventional apparatus, the signal patterns comprising the marker signals become conspicuous on the displayed picture and the superimposed signal patterns become offensive to the eye, thereby resulting in degraded performance of the product on which such processing is effected.

Figure 4B:
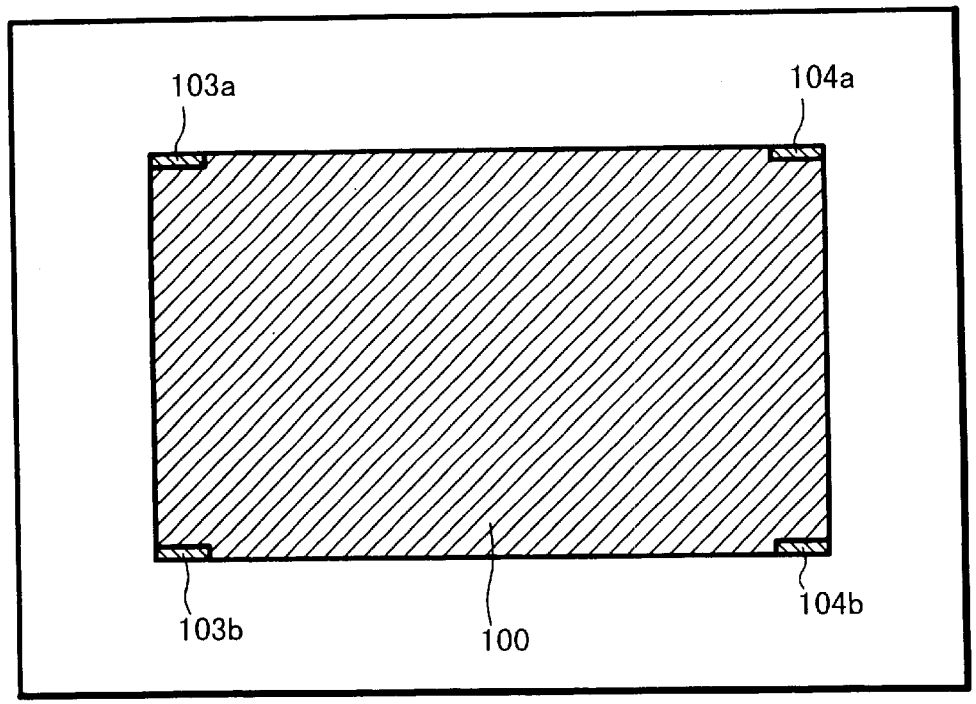

That is, according to this apparatus, there are blanked only one upper and lower scanning lines of the area 100 in FIG. 4B of the image such as the captured photograph, moving picture and the like. Therefore, since the signal patterns comprising the marker signals are blanked, it is possible to make the superimposed signal patterns become inconspicuous.

Also, even when the size, position and the like of the area 100 are changed, since the blanking signal is automatically generated at the constant optimum timing following such changes, the signal patterns can be prevented from being displayed on the picture screen inadvertently. Further, by discriminating and correcting a resolution of a displayed image and a deflection frequency or the like with the microcomputer 40, it is possible to constantly generate a blanking signal at an optimum timing.

Incidentally, in the above-mentioned apparatus, the time duration of the signal patterns comprising the marker signal is calculated by the microcomputer 40. Accordingly, by using information of this time duration, it is possible to arrange a circuit in such a manner that the blanking signals 103a, 104a, 103b, 104b are generated only in the portions of the signal patterns 101a, 102a, 101b, 102b as shown in FIG. 4B so that only the portions may be blanked.

Figure 5A:
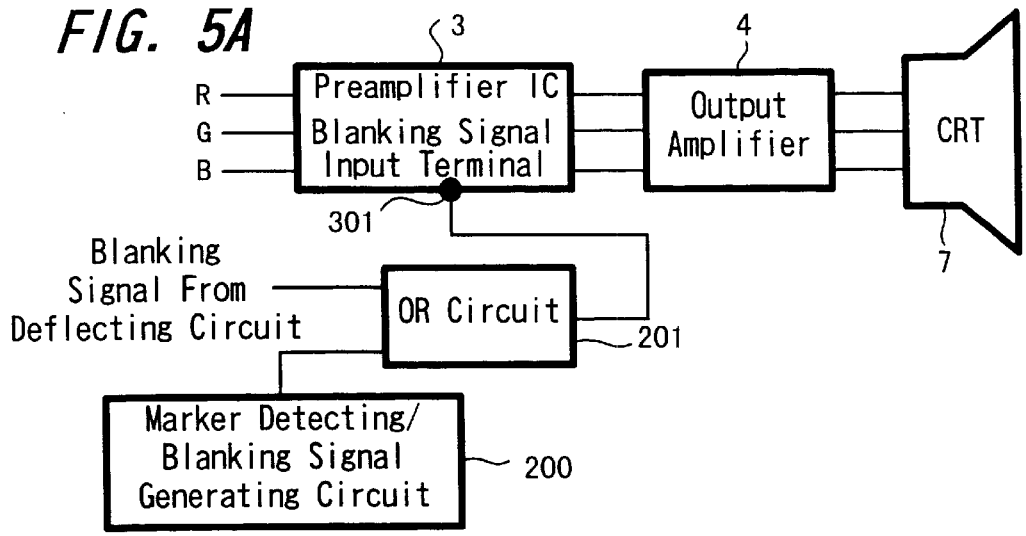
FIGS. 5A, 5B and 5C are each a diagram used to explain how to apply a blanking.
Figure 5B:
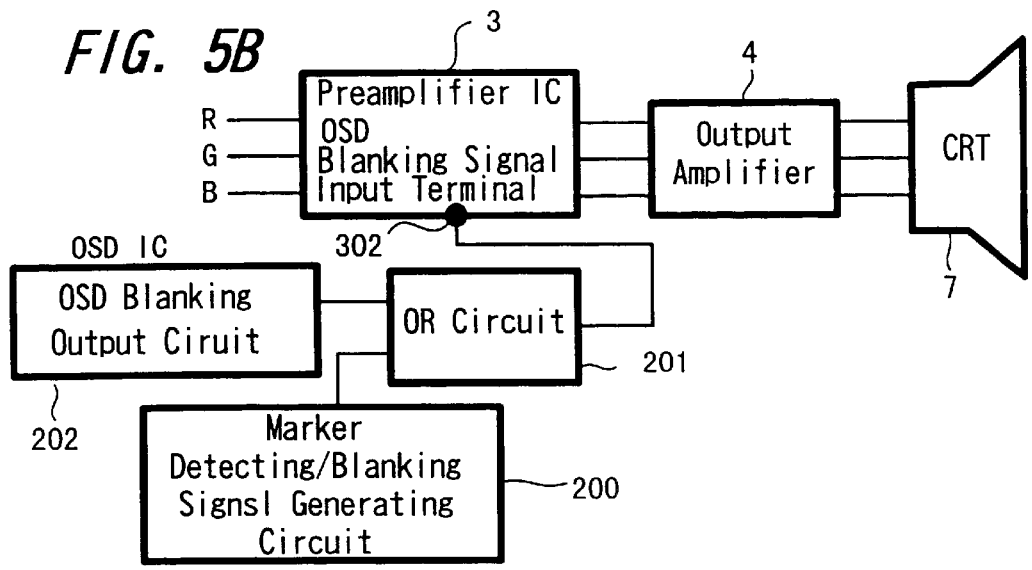
Figure 5C:
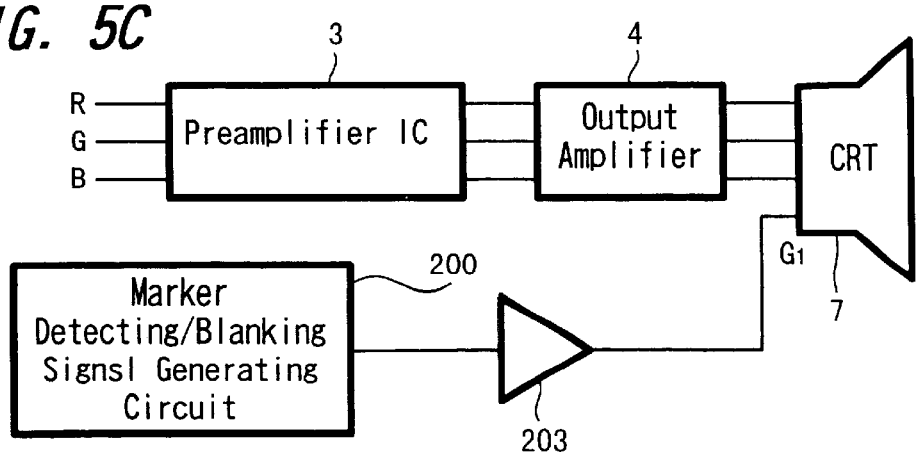

While the signal patterns are blanked by supplying the generated blanking signals to the amplifiers 33R, 33G, 33B provided within the preamplifier IC 3, for example, in the above-mentioned apparatus, as shown in FIG. 5A, for example, this can be realized when the output (the output terminal 54 of the OR circuit 53) of the above-mentioned marker detecting/blanking signal generating circuit 200 and the blanking signal from a deflection circuit (not shown) are synthesized together by an OR circuit 201 and supplied to the blanking input terminal 301 of the preamplifier IC 3.

Alternatively, a display apparatus having a so-called on-screen display (OSD) means mounted thereon is provided with a means for blanking a video signal because the OSD signal has a priority over a background video signal during an interval in which this OSD is displayed. Therefore, if the output from the above-mentioned circuit 200 is synthesized with a blanking signal from an OSD IC 202 by the OR circuit 201 and supplied to the OSD blanking input terminal 302 of the preamplifier IC 3, then the above-mentioned processing can be realized.

Further, a display apparatus using a CRT, for example, is provided with a means for presenting a state that an image is not displayed (black) even when a video signal is applied to a cathode if a voltage lower than a predetermined cutoff voltage is applied to an electrode called a G1 electrode, for example, within a variety of electrodes set. Accordingly, by supplying the output of the above-mentioned circuit 200 to a G1 blanking amplifier 203, for example, it is possible to realize the aforementioned processing.

Figure 6:
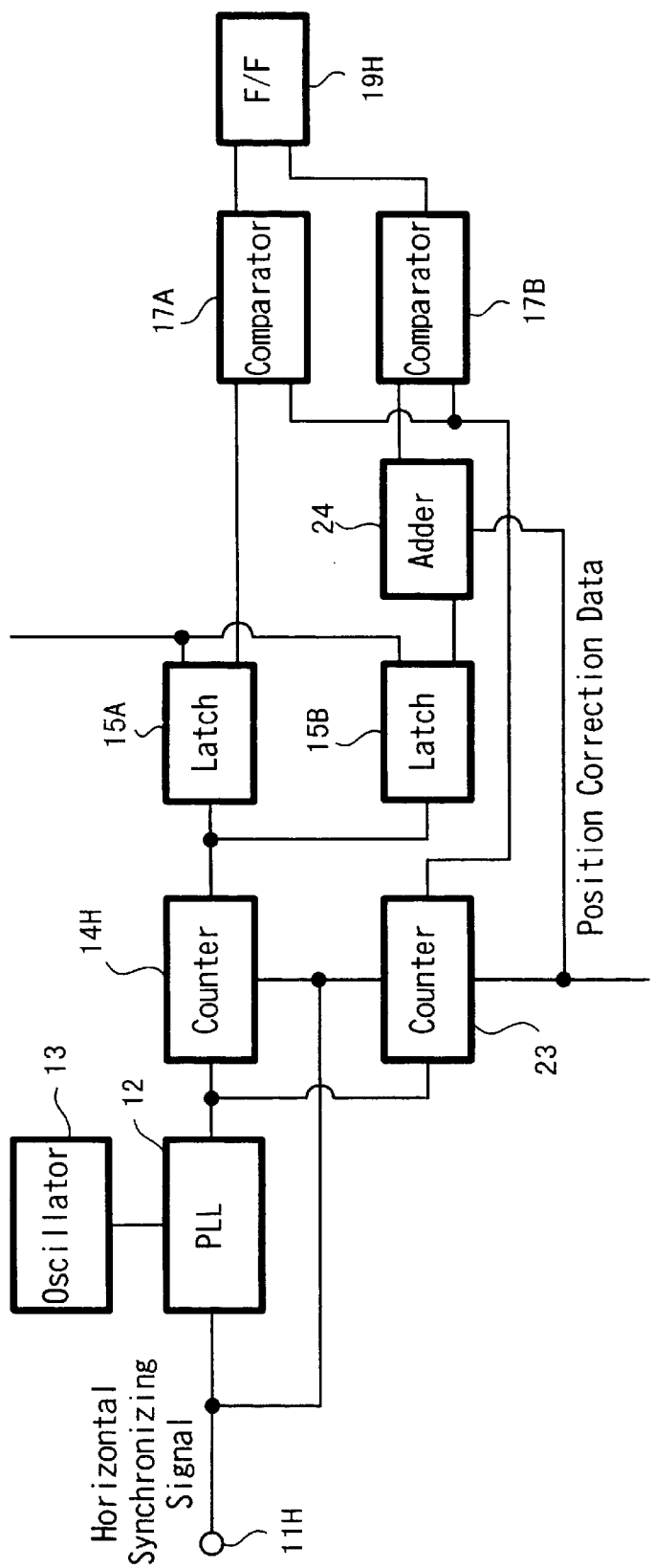
FIG. 6 is a block diagram showing a main portion of other example of the control signal generating circuit according to the first embodiment of the present invention.

Further, FIG. 6 shows an example of other arrangement of a control signal generating circuit as the above-mentioned one embodiment of the present invention. Incidentally, in FIG. 6, only a main portion is illustrated, and a rest of arrangement is the same as that of FIG. 1.

In FIG. 6, there is provided a counter 23 for simultaneously counting with the above-mentioned horizontal counter 14H, for example. Position correction data corresponding to a time duration is pre-loaded to this counter 23 from the above-mentioned microcomputer 40 (not shown), and the count value of this counter 23 is supplied to the comparators 17A and 17B. At the same time, an adder 24 is connected to the output of the latch circuit 15B, and this adder 24 adds the above-mentioned position correction data.

That is, in this case, the position of the displayed picture is relatively shifted to the rear and the position correction data is added to the output of the latch circuit 15B, whereby the area 100 can be detected by the signal patterns 101a, 101b, 102a, 102b provided in the inside of the area 100. Then, in this case, it is possible to reduce the overall circuit scale by using the adder instead of the subtractor.

Figure 7:
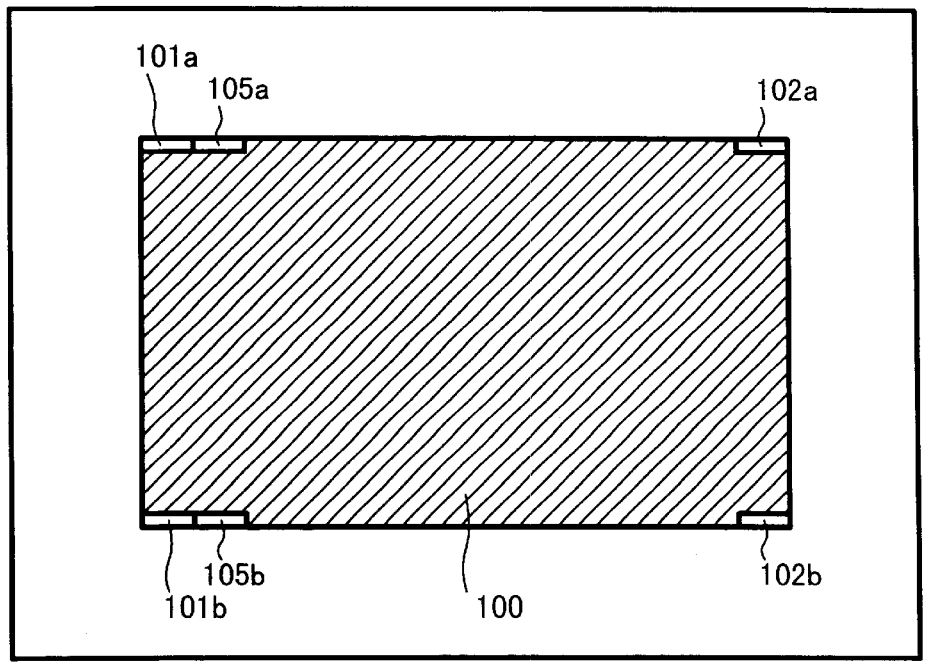
FIG. 7 is a diagram used to explain a control signal generating circuit according to a second embodiment of the present invention.

Further, in the above-mentioned control signal generating circuit, as another embodiment according to the present invention, by adding a code capable of measuring a time duration of the above-mentioned signal pattern to the marker signal, it is possible to more simply correct the position of the signal pattern. That is, as shown in FIG. 7, for example, arbitrary marker signals 105a, 105b indicating the end of the patterns are added to the signal patterns 101a, 101b comprising the marker signal.

Figure 8:
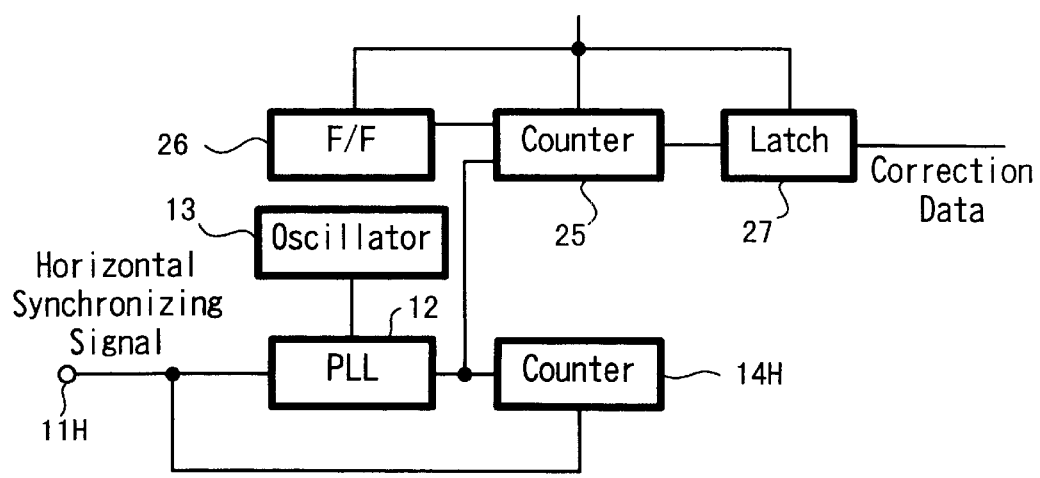
FIG. 8 is a block diagram of a main portion of an example of a control signal generating circuit according to the second embodiment of the present invention.

Accordingly, when a time duration is measured by using the marker patterns 105a, 105b, a time duration can be measured as shown in FIG. 8, for example. That is, as shown in FIG. 8, there is provided a counter 25 which counts at the same time with the above-mentioned horizontal counter 14H. Concurrently therewith, there is provided a flip-flop 26 which is set/reset by the detection signals of the signal patterns 101*a*, 101*b* and marker signals 105*a*, 105*b* for example. The counting of the counter 25 is controlled by the output from this flip-flop 26.

Thus, the counter 25 outputs a count value corresponding to a time ranging from the ending end of the signal patterns 101*a*, 101*b* to the ending end of the marker signals 105*a* for example. Accordingly, by determining the positions of the signal patterns 105*a*, 105*b* in such a manner that this time agrees with the duration time of the signal patterns 101*a*, 101*b*, it is possible to measure the time duration of the above-mentioned signal pattern. Then, this count value is set in the latch circuit 27, whereby the position of the signal pattern can be corrected similarly as described above.

That is, in this case, the marker signals capable of measuring the duration of the marker signal are added to the marker signal, whereby the blanking signal can be generated by measuring the position and the time duration of the signal pattern without using the housed microcomputer 40 or the like. Thus, the signal pattern can be blanked by a simple arrangement.

Further, in this processing for providing such marker signals, when the video signals that are supplied to the input terminals 1R, 1G, 1B are generated from an outside computer (not shown) or the like, only software should be added to the computer (not shown) or the like of the master device and such outside computer need not be modified from a hardware standpoint. Accordingly, the apparatus to which the present invention is applied can be connected to arbitrary general-purpose computers or the like when in use.

Moreover, the aforementioned present invention can also be applied to the case in which the video signal with such marker signals is recorded on a recording medium such as a video tape, a video disk or the like and an image is displayed by reproducing such recording medium.

Moreover, according to the aforementioned apparatus, when the above-mentioned processing is executed, a user need not execute any operation and the processing can be executed automatically. For example, even when the area 100 is moved or the size of the area is changed considerably, the processing can follow the position of the moved area and the changed size of such area.

As described above, since the above-mentioned control signal generating circuit using a marker signal in which a video signal has a signal which results from combining primary color signals of predetermined levels by an arbitrary pattern, a marker code is generated by a pattern of other of the primary color signals using the pattern of the one primary color signal as a clock, the marker signal designating an arbitrary area of a picture displayed by at least the video signal, including a marker signal detector for detecting the marker signal, a frequency measuring device for measuring horizontal and vertical synchronizing signal frequencies of the video signal, a processor for calculating a time duration of the marker signal from the measured horizontal and vertical synchronizing signal frequencies and the length of the marker signal, and a blanking signal generator for generating a blanking signal for blanking the video signal by designating an area including the marker signal with the calculated time duration, it is possible to improve performance of a resultant product by making the superimposed signal pattern become inconspicuous.

Further, since a control signal generating circuit using a marker signal in which a video signal has a signal which results from combining primary color signals of predetermined levels by an arbitrary pattern, a marker code is generated by a pattern of other of the primary color signals using the pattern of the one primary color signal as a clock, the marker signal has marker signal capable of designating an arbitrary area of a picture displayed by at least a video signal and measuring a duration of the marker signal to the marker signal added to a horizontal direction starting end of at least the area, including a marker signal detector for detecting the marker signal, a processor for calculating a time duration of the marker signal by using the marker signal capable of measuring the duration, and a blanking signal generator for generating a blanking signal for blanking the video signal by designating an area including the marker signal with the calculated time duration, the blanking signal can be generated by measuring the position and the time duration of the signal pattern without using the housed microcomputer or the like. Thus, the signal pattern can be satisfactorily blanked by a simple arrangement.

Incidentally, the present invention is not limited to the aforesaid embodiments, and can be variously modified without departing from the spirit of the present invention. For example, in order to make the area including the marker signal inconspicuous, the luminance is varied, another signal is exchangably used therefor, or the like.

Therefore, according to one invention, relative to a video signal upon which marker signals for designating an arbitrary area of a displayed picture are superimposed, the marker signal and its time duration are detected, and a blanking signal for blanking the video signal is generated by designating an range including such marker signal. According to this arrangement, it is possible to improve commerciality of a product on which such processing is effected by making the superimposed signal patterns become inconspicuous.

Thus, the conventional apparatus encounters with the problems in which the signal patterns comprising the marker signal become conspicuous on the displayed picture and the superimposed signal pattern becomes offensive to the eye, thereby resulting in commerciality of a resultant product being degraded remarkably. According to the present invention, these problems can be solved with ease.

That is, according to this apparatus, there are blanked only one upper and lower scanning lines of the area of the image such as the captured photograph, moving picture or the like. Therefore, since the signals patterns comprising the marker signals are blanked, it is possible to make the superimposed signal patterns become inconspicuous.

Also, even when the size, position and the like of the area are changed, since the blanking signal is automatically generated at the constant optimum timing following such changes, the signal patterns can be prevented from being displayed on the picture screen inadvertently. Further, by discriminating and correcting a resolution of a displayed image and a deflection frequency or the like with the housed microcomputer, it is possible to constantly generate a blanking signal at an optimum timing.

Further, in general, the preamplifier IC for amplifying a video signal has a control terminal for blanking the video signal. Thus, if the blanking signal is applied to the control terminal, the present invention may be realized by a simple circuit arrangement.

Furthermore, according to another invention, the marker signal capable of measuring the duration of the marker signal is added to the marker signal, whereby the blanking signal can be generated by measuring the position and the time duration of the signal pattern without using the above-mentioned housed microcomputer or the like. Thus, the signal pattern can be satisfactorily blanked by a simple arrangement.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A display image correction circuit for correcting a display image in an arbitrary area of a picture screen designated by marker signals by detecting said marker signals that are superimposed on a video signal and formed by two of three primary color signals having arbitrary signal patterns of predetermined level and using a remaining one of the three primary color signals as a color clock comprising:

measuring means for measuring horizontal and vertical synchronizing signal frequencies of said video signal;

processing means for calculating a time duration of said marker signals from said measured horizontal and vertical synchronizing signal frequencies; and control generating means for generating a control for making an area including said marker signals inconspicuous where designated by said calculated time duration, wherein said marker signals are divided into two pairs of marker signals each provided within a same scanning line and a first marker signal within a same scanning line is followed by an adjacent marker signal, and wherein said processing means calculates the time duration by using said adjacent marker signal in place of said first maker; and said control signal generating means generates the control signal for making an area including said marker signals inconspicuous where designated by said calculated time duration using said adjacent marker signal.

2. The display image correction circuit as claimed in claim 1 wherein said control signal is a blanking signal for blanking said area.

3. A display image correction method for correcting a display image in an arbitrary area of a picture screen where designated by marker signals by detecting said marker signals superimposed on a video signal and formed by two of three primary color signals which have arbitrary signal patterns of predetermined level and using the remaining one of said three primary color signals as a clock, comprising the steps of:

measuring horizontal and vertical synchronizing signal frequencies of said video signal;

calculating a time duration of said marker signals from said measured horizontal and vertical synchronizing signal frequencies; and generating a control signal for making an area including said marker signals inconspicuous where designated by said calculated time duration, wherein said marker signals are divided into two pairs of marker signals each provided within a same scanning line, and a first marker signal within a same scanning line is followed by an adjacent marker signal, and said step of:

calculating a time duration includes using said adjacent marker signal in place of said first marker signal; and said step of generating a control signal for making an area including said marker signals inconspicuous where designated by said calculated time duration uses said adjacent marker signal.

4. The display image correction method as claimed in claim 3, wherein said control signal is a blanking signal for blanking said area.

* * * * *